United States Patent [19]

Kinjo

[11] 4,365,279

[45] Dec. 21, 1982

[54] MAGNETIC RECORDING AND REPRODUCING APPARATUS WITH DEVICE FOR TRACKING CONTROL OF ROTARY MAGNETIC HEADS

[75] Inventor: Hisao Kinjo, Yokohama, Japan

[73] Assignee: Victor Company of Japan, Ltd., Yokohama, Japan

[21] Appl. No.: 178,852

[22] Filed: Aug. 18, 1980

[30] Foreign Application Priority Data

Aug. 21, 1979 [JP] Japan ................................ 54-106451
Aug. 22, 1979 [JP] Japan ................................ 54-106862

[51] Int. Cl.$^3$ ...................... G11B 21/18; G11B 21/10; G11B 5/52
[52] U.S. Cl. ........................................ 360/109; 360/77
[58] Field of Search ................... 360/109, 107, 77, 70, 360/84, 130.22, 130.23, 130.24; 358/4, 8

[56] References Cited

U.S. PATENT DOCUMENTS

| | | |
|---|---|---|
| 2,751,439 | 6/1956 | Burton . |
| 3,995,317 | 11/1976 | Schmidt ............................ 360/109 |
| 4,131,924 | 12/1978 | Behr et al. ......................... 360/77 |
| 4,178,606 | 12/1979 | Hirota ................................ 358/4 |
| 4,184,181 | 1/1980 | Mijatovic .......................... 360/77 |
| 4,189,758 | 2/1980 | Morio et al. ....................... 360/77 |
| 4,236,185 | 11/1980 | Obremski ......................... 360/109 |

FOREIGN PATENT DOCUMENTS 1275580 8/1968 Fed. Rep. of Germany .
2004093 3/1979 United Kingdom .
2034956 6/1980 United Kingdom .

Primary Examiner—Alfred H. Eddleman
Attorney, Agent, or Firm—Louis Bernat

[57] ABSTRACT

A magnetic recording and reproducing apparatus comprised a rotary swinging member provided integrally with a pair of arcuate yoke parts at positions opposed in a diametral direction of a rotating plane of the rotary swinging member about a rotation center thereof permanent magnets respectively fixed to the pair of yoke parts in a state where their opposite polarities are opposed a pair of rotary magnetic heads supported on the rotary swinging member at positions opposed in a diametral direction of a rotating plane of the rotary swinging member about a rotation center thereof in a state where tips of the heads projecting outwards from outer surface of the yoke parts a fulcrum member for supporting the rotary swinging member in a freely swinging manner and acting as a fulcrum for swinging in a direction perpendicular, at a rotation center, to a line connecting the pair of rotary magnetic heads and a control coil of cylindrical shape disposed at a position where the control coil exists in a magnetic field formed by the permanent magnet rotating with the rotary swinging member. The control coil is supplied with a control signal. The rotary swinging member swings in response to the control signal with the fulcrum member as a fulcrum for swinging.

7 Claims, 13 Drawing Figures

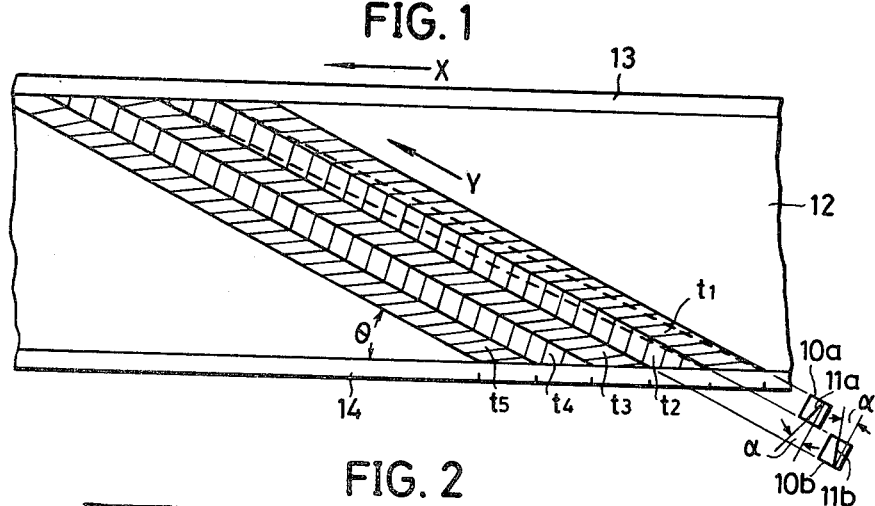
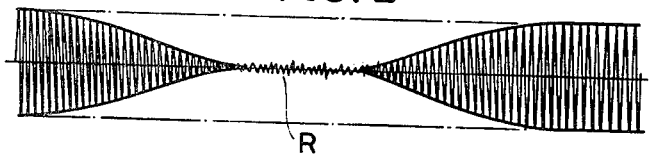
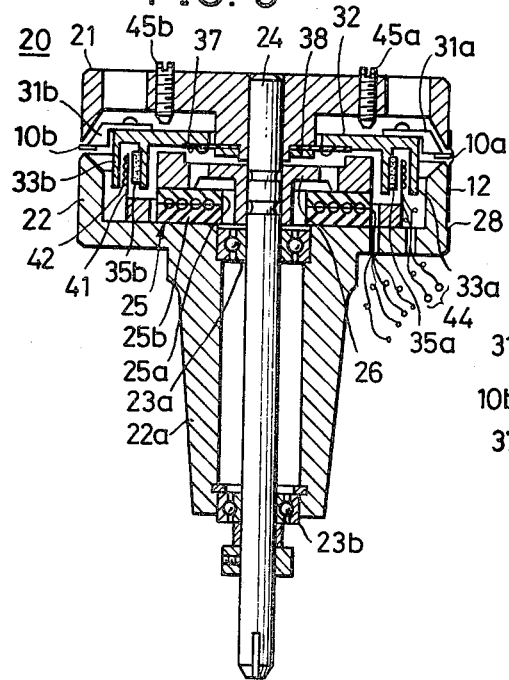
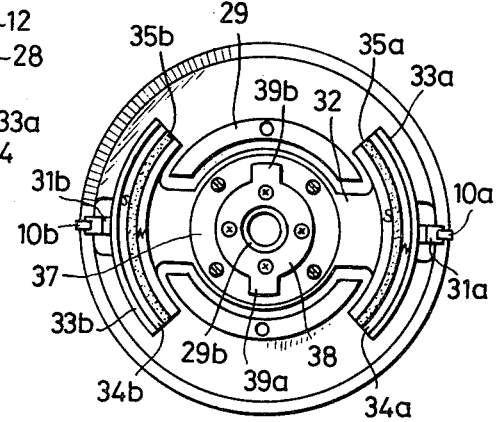

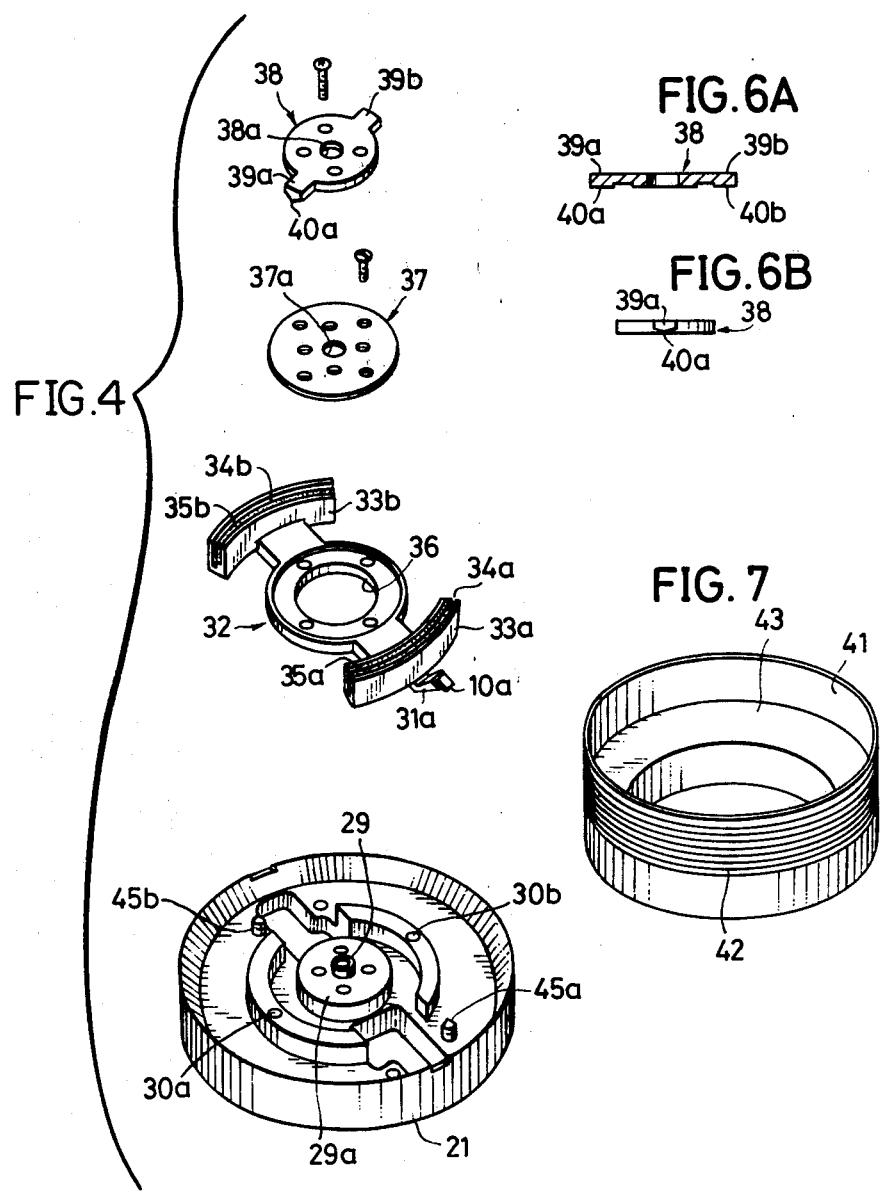

MAGNETIC RECORDING AND REPRODUCING APPARATUS WITH DEVICE FOR TRACKING CONTROL OF ROTARY MAGNETIC HEADS

BACKGROUND OF THE INVENTION

The present invention relates to magnetic recording and reproducing apparatuses having devices for tracking control of rotary magnetic heads. More particularly, the invention relates to a magnetic recording and reproducing apparatus having a device which performs tracking control by controlling the positions of the rotary magnetic heads so as to correct for tracking deviations of the rotary magnetic heads which inevitably occur particularly during still-picture reproduction, slow-motion reproduction, and quick-motion reproduction thereby to obtain accurate and positive tracking of the rotary heads.

The assignee of the present invention has previously developed a system wherein tracks are formed on a tape without gaps to guard bands between adjacent tracks. Moreover, a color video signal can be recorded and reproduced on such a tape without the occurrence of an interference beat disturbance. This system is described in U.S. patent application Ser. No. 731,935, now U.S. Pat. No. 4,178,606, entitled "Color video signal recording and/or reproducing system" filed Oct. 13, 1976, and assigned to the assignee of this application. In this previously developed system, a pair of azimuth heads have gaps which are inclined with a certain azimuth angle, in mutually opposite directions with respect to a direction perpendicular to the longitudinal direction which is of the track. Adjacent tracks are formed in contiguous contact side-by-side without a gap or guard band therebetween. The phase of the chrominance signal is shifted by 90 degrees for every horizontal scanning period. The direction of this phase shifting is reversed from one track to the next adjacent track. In accordance with this system, the tape utilization efficiency is high since the tracks are in close contact with each other. Moreover, there is no beat disturbance.

On the other hand, the prior art employs a system wherein a video signal is recorded on a magnetic tape in parallel tracks, formed obliquely to the longitudinal direction of the magnetic tape. This tape may either be stopped or transported at different speeds at the time of playback in order to carry out a speed-change in the reproduction, such as quick-motion reproduction, slow-motion reproduction, or still picture reproduction. In this known system, the tape travel speed at the time of reproduction is different from that at the time of recording. The tracing path of the rotary head relative to the tape during reproduction differs from the tracing path (track) of the rotary head during recording, whereby so-called tracking deviation occurs.

In the proposed system mentioned above, when tracking deviation occurs as a result of reproduction at changed speed, a so-called reverse tracking, in which one of the heads traces a part of a track recorded by a head having the same azimuth as the other hand, occurs partially. With respect to this part traced by reverse tracking, there is almost no reproduction of the recorded signal because of azimuth loss. For this reason, when tracking deviation occurs, the reproduced signal level drops, and, in accordance with this, a noise component due to a reduction of the reproduced signal level accompanying tracking deviation will appear at irregular positions on the reproduced picture screen. For this reason, the noise part in the picture moves, and the S/N ratio of the entire picture becomes poor. Consequently, a speed-change reproduced picture cannot be obtained in good picture quality.

Accordingly, as a system for correcting for tracking deviation at the time of changed-speed reproduction, a control system in which displacement devices in which piezoelectric elements are used are separately provided respectively for a pair of rotary magnetic heads on a rotary structure, and the magnetic heads are separately caused to undergo displacement by their respective displacement devices, whereby each rotary head accurately carries out correct tracking, has been devised.

However, since it is necessary in this devised control system to provide displacement devices separately for respective rotary magnetic heads, the composition of the system becomes complicated. Furthermore, in the case where there is a deviant difference between the operations of the rotary magnetic heads, both rotary magnetic heads cannot be satisfactorily tracking controlled in a mutually interrelated manner.

SUMMARY OF THE INVENTION

Accordingly, it is a general object of the present invention to provide a magnetic recording and reproducing apparatus having a novel and useful device for tracking control of rotary magnetic heads, in which the above described problems have been overcome.

Another and specific object of the invention is to provide a magnetic recording and reproducing apparatus having a device for so carrying out control that an up-down rotary swinging displacement member provided at its two ends with respective rotary magnetic heads is caused to swing about its center as its swing center, and that each rotary magnetic head accurately and positively carries out correct tracking. By the use of the device of the present invention, when the rotary swinging displacement member is so displaced that one rotary magnetic head accomplishes correct tracking with respect to one track, the other rotary magnetic head provided on the other end of the rotary swinging displacement member is also displaced automatically in the direction for correct tracking. For this reason, the composition of the device is simple, and, moreover, there is no deviant errors as in known devices, whereby tracking control can be readily carried out accurately and positively.

Still another object of the invention is to provide a magnetic recording and reproducing apparatus having the above described device wherein, by electrically adjusting the position of the swing center of the rotary swinging displacement member in the above described device, the height position of the heads can be adjusted.

A still further object of the present invention is to provide a magnetic recording and reproducing apparatus provided with a stop mechanism for restraining the excess swinging motion of the rotary swinging member in the above described device.

Further objects and features of the invention will be apparent from the following detailed description when read in conjunction with the accompanying drawings.

BRIEF DESCRIPTION OF THE DRAWINGS

FIG. 1 is a diagram for illustrating an example of a track pattern on a magnetic tape and a tracing locus of a rotary magnetic head under no tracking control upon still picture reproduction;

FIG. 2 is a graph for illustrating the envelope of a signal reproduced by the rotary magnetic head;

FIG. 3 is a vertical sectional view of a first embodiment of the magnetic recording and reproducing apparatus of the present invention;

FIG. 4 is an exploded perspective view of an essential part of the apparatus of FIG. 3 as viewed from bottom side;

FIG. 5 is a bottom view of a rotary upper drum of the apparatus of FIG. 3;

FIGS. 6A and 6B are respectively a vertical sectional side view and a front view of a fulcrum member;

FIG. 7 is a perspective view of a control coil;

DETAILED DESCRIPTION OF THE INVENTION

Figure 8:
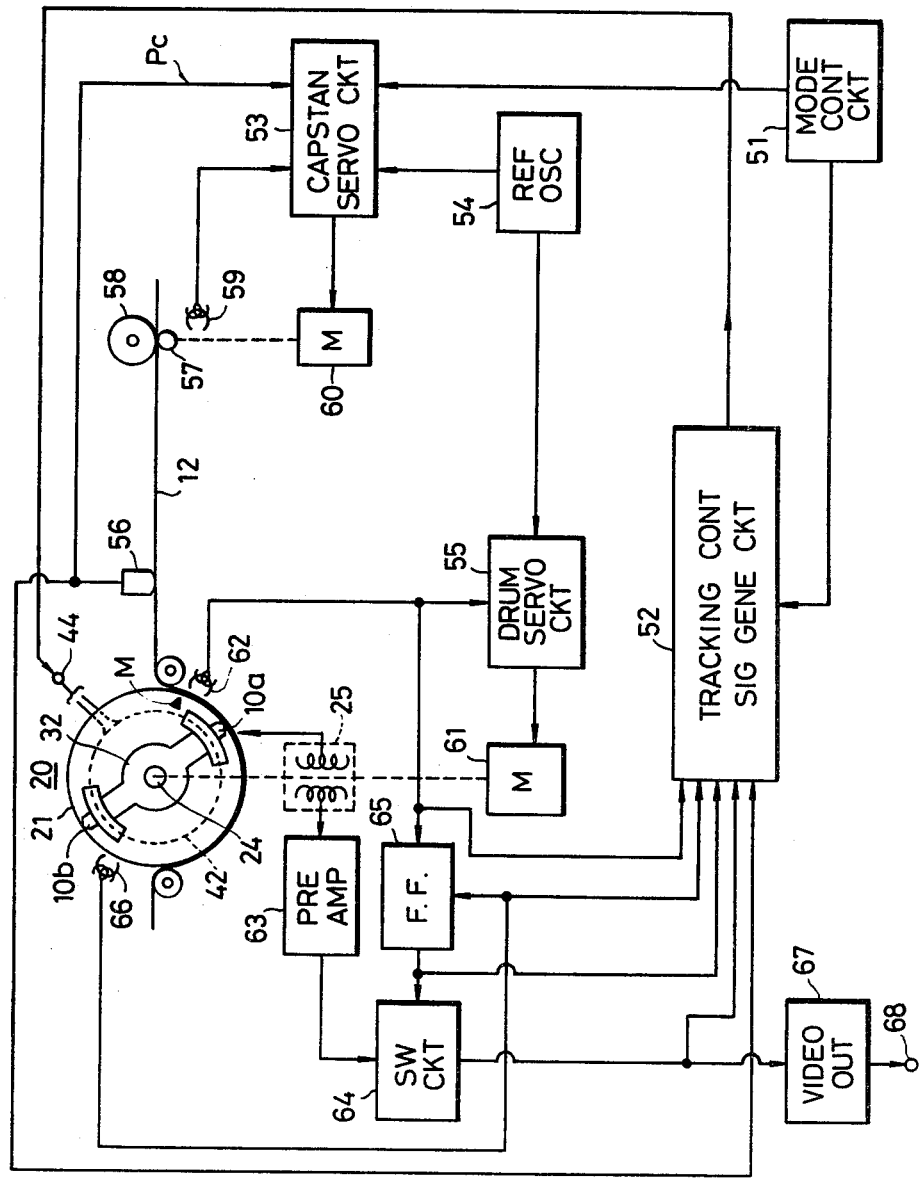
FIG. 8 is a block diagram of one embodiment of a tracking control system applied to the apparatus of the present invention.

One example of a track pattern on a magnetic tape to be reproduced by the apparatus of the present invention is shown in FIG. 1.

Rotary magnetic heads 10a and 10b have respective azimuth gaps 11a and 11b inclined at an azimuth angle $\alpha$ which is mutually in opposite directions, relative to the direction perpendicular to the scanning direction. The azimuth gaps 11a and 11b have the same track width. The tracks recorded and formed on the tape 12 travelling in the arrow direction X by the video head 10a rotating in the arrow direction Y are designated by the characters $t_1, t_3, t_5, \ldots$ (wherein the subscripts of t are odd numbers). The tracks recorded and formed by the video head 10b are designated by the characters $t_2, t_4, t_6, \ldots$ (wherein the subscripts of t are even numbers). The tracks $t_1, t_2, t_3, \ldots$ are in contiguous contact without gaps or guard bands therebetween, whereby the tape utilization efficiency is high. Each track is recorded with a part of a video signal corresponding to substantially one field. A vertical synchronizing signal is positioned near an end of the track. Although not shown, an audio signal and a control signal are recorded respectively at the upper and lower lateral edges of the tape 12 and along tracks 13 and 14 in the longitudinal direction of the tape.

Then, during normal reproduction, the magnetic tape 12 is caused to travel in the X direction at the same speed as at the time of recording, and tracing and reproduction of tracks $t_1, t_3, t_5, \ldots$ by the head 10a and tracks $t_2, t_4, t_6, \ldots$ by the head 10b are alternately carried out. In this connection, if the head 10a were to trace the tracks $t_2, t_4, \ldots$ and the head 10b the tracks $t_1, t_3, \ldots$ (that is, if a so-called opposite tracking were to be carried out), there would be almost no reproduction of signals because of azimuth loss. Accordingly, the rotational phases of the rotary heads are ordinarily so controlled by a control signal that a track recorded by a head having a certain gap of azimuth is traced by a head having a gap of the same azimuth angle.

When the travel of the magnetic tape 12 having the above described track pattern is stopped, and still-picture reproduction is carried out, since the magnetic tape 12 is stopped, the tracing path of the heads 10a and 10b of a conventional magnetic recording and reproducing apparatus begins from the starting end of the track $t_1$, straddles the track $t_2$ at an intermediate part, and terminates at the finishing end of the track $t_2$ as indicated by broken line in FIG. 1. Consequently, the heads 10a and 10b carry out tracing as they give rise to tracking deviation with respect to the tracks $t_1$ and $t_2$.

Here, the head 10a reproduces the recorded signal with regular tracking with respect to the track $t_1$ but does not reproduce the signal with opposite tracking with respect to the track $t_2$, while the head 10b does not reproduce the signal with opposite tracking with respect to the track $t_1$ and reproduces the signal with regular tracking with respect to the track $t_2$. Accordingly, the envelope of the signals reproduced by the heads 10a and 10b becomes as indicated in FIG. 2, and the reproduced signal level at the time of opposite tracking of the heads 10a and 10b is substantially close to zero as indicated at the part R, whereby the signal is composed essentially of only a noise component.

Accordingly, in the apparatus of the present invention, the head 10a is caused by an organization of means described hereinafter to undergo displacement such that, as it traces, it does not trace the track $t_2$ but continues to trace over the track $t_1$. As the head 10a undergoes this displacement, the head 10b undergoes displacement in the direction opposite to the displacement direction of the head 10a as a result of a seesaw movement discribed hereinafter. Therefore, at the time when the head 10a finishes its scanning of the track $t_1$, the head 10b is automatically and inevitably caused to be at the starting end position of the track $t_2$ and starts tracing from this position.

As the head 10b thus traces, it is caused to undergo displacement in a manner such that it will continue to trace the track $t_2$. As the head 10b is thus displaced, the head 10a is displaced by the seesaw movement in the direction opposite to the displacement direction of the head 10b, and the head 10a again traces the track $t_1$ from its starting end. Thereafter the above described operation is repeated, and the heads 10a and 10b alternately carry out tracing in regular tracking. As a result, the envelope of the reproduced signal level becomes as indicated by single-dot chain lines in FIG. 2, and an excellent still reproduced picture which is without reduced level and therefore is not affected by noise, thereby having a high S/N ratio, is obtained.

In this connection, in the case where the magnetic tape 12 is caused to travel in the arrow direction X at a speed slower than normal speed, and slow-motion reproduction is carried out, the rotary heads 10a and 10b trace along a tracing path of an inclination angle between the inclination angle $\theta$ of the tracks $t_1, t_2, \ldots$ and the inclination angle of the above-mentioned tracing path indicated by broken line. In the case where the magnetic tape 12 is caused to travel at a speed higher than the normal speed, and quick-motion reproduction is carried out, the heads 10a and 10b trace along a tracing path of an inclination angle greater than the track inclination angle $\theta$.

In the case where the relationship between the travelling direction of the magnetic tape and the tracing direction of the heads differs from the aforedescribed relationship shown in the drawing, the relationship between the inclination angles of the tracing paths also, of course, differs accordingly as a natural result.

Next, an embodiment of the magnetic recording and reproducing apparatus according to the present invention having a device for causing the heads 10a and 10b to undergo displacements by a seesaw movement will now be described in conjunction with FIG. 3 and succeeding figures.

The guide drum assembly 20 comprises, essentially, a rotary upper drum 21 and a stationary or fixed lower guide drum 22. On the lower side of the fixed drum 22, a housing part 22a is formed integrally and coaxially therewith. This housing part 22a has a hollow interior, in which are supported bearings 23a and 23b coaxially aligned with the fixed drum 22. A rotary shaft 24 extends coaxially through the centers of the fixed drum 22 and the housing part 22a and is rotatably supported by the bearings 23a and 23b. The rotary drum 21 is coaxially mounted on a flywheel 26 by screws passing through screw holes 30a and 30b shown in FIG. 4. The flywheel 26 is coaxially fixed to the rotary shaft 24. The rotary shaft 24 is rotated by a head motor (not shown) at a specific rotational speed of, for example, 30 revolutions per second (rps.)

A rotatable part of an annular rotary transformer 25 is secured coaxially to the flywheel 26 and a stationary part 25b is secured coaxially to the fixed drum 22.

A lead 28 for guiding a magnetic tape 12 is provided in a helical state around one part of the outer peripheral surface of the fixed drum 22.

The rotary magnetic heads 10a and 10b are supported by head brackets 31a and 31b made of nonmagnetic material. The head brackets 31a and 31b are mounted on a rotary swinging member 32 which performs a seesaw operation as described hereinafter and are so adjustably positioned thereon that the heads 10a and 10b are in diametrically opposed positions on a diametric line perpendicular to and intersecting the axis of rotation. The rotary swinging member 32 is made of a ferromagnetic material such as mild steel, for example, and has a pair of diametrically opposed yoke parts 33a and 33b, which are integrally formed, being integrally joined by spoke parts and a central mounting ring. These yoke parts 33a and 33b, in vertical section taken along a plane passing through the rotational axis, have inverted-U shapes and, in plan view, being of arcuate shape as shown in FIGS. 4 and 6, having arcuate grooves 34a and 34b.

On one of the inner side walls of the grooves 34a and 34b of the yoke parts 33a and 33b, there are respectively secured permanent magnets 35a and 35b, which are respectively magnetized in their thickness direction and have mutually opposite polarities such that in the case where the inner surface of the magnet 35a is the south (S) pole, for example, the inner circumferential surface of the magnet 35 is the north (N) pole.

As shown in FIG. 4, a resilient flexible plate 37 made of, for example, phosphor bronze is fixed at its outer peripheral part to an annular mounting surface 36 of the rotary swinging member 32 by means such as screws, for example. The flexible plate 37 has a central hole 37a in which the central projection 29 of the rotary drum 21 is fitted. Furthermore, the projection 29 is fitted also in a central hole 38a of a fulcrum member 38, and the fulcrum member 38 and a supporting surface 29a of the projection 29 are secured together by means such as screws, for example. By this construction, the rotary swinging member 32 is fixed integrally to the projection 29 of the rotary drum 21 by way of the flexible plate 37 interposed therebetween. The rotary swinging member 32 is thereby rotated together with the rotary drum 21. As shown in FIGS. 6A and 6B, the fulcrum member 38 has a disc-shaped central part and two trunnion arms 39a and 39b formed integrally with the central part and extending in diametrically opposite directions therefrom. At their outer end parts, the trunnion arms 39a and 39b have knife edges 40a and 40b.

Furthermore, at the same time, the rotary swinging member 32 can swing in seesaw motion by resilient deformation of the flexible plate 37 about the knife edges 40a and 40b of the trunnion arms 39a and 39b of the fulcrum member 38 as pivotal centers so as to vary the angle between the rotary swinging member 32 and a plane perpendicular to the axial direction of the rotary shaft 24.

A cylindrical control coil 42 wound around a cylindrical bobbin 41 shown in the perspective view of FIG. 7 is fixed by way of an annular bracket 43 to the fixed drum 22. The control coil 42 is disposed at a position where it is in freely inserted state within the grooves of the yoke parts 33a and 33b of the rotary swinging member 32. This control coil 42 is provided with terminals 44 through which a control current can be passed to the control coil.

The control coil 42 is thus residing within a DC magnetic field formed by the permanent magnets 35a and 35b mounted on the yoke parts 33a and 33b. Accordingly, when a control current is passed through this control coil 42 as described hereinafter, the yoke parts 33a and 33b and the permanent magnets 35a and 35b are subjected to a displacing force tending to displace these parts in rotation. In this case, since the permanent magnets 35a and 35b are magnetized with mutually oppositely directed polarities, the rotary member 32 undergoes a seesaw motion by deformation of the flexible plate 37 about the above described knife edges 40a and 40b as pivots in a rotational direction according to the polarity of the current and with a torque according to the magnitude of the current value. This seesaw motion of the rotary swinging member 32 takes place during its unitary rotation with the rotary drum 21.

Screws 45a and 45b are fastened to the rotary drum 21 at the positions confronting the rotary member 32. The screws 45a and 45b are used as stoppers. When the rotary swinging member 32 is tilted excessively in the seesaw motion, the rotary swinging member 32 is engaged by the screws 45a and 45b, whereby the excessive swings of the rotary swinging member 32 is prevented. It is thereby effectively prevented that the heads 10a and 10b are excessively displaced and abut against the peripheral edge of the rotary drum 21 or fixed drum 22 resulting in suffering damages.

With respect to this seesaw motion, the weight of the rotary swinging member 32 on the two sides of the fulcrum point is maintained in balance, and all of the weight of the rotary swinging member 32 can be considered to be concentrated at the fulcrum point. Moreover, the construction is such that the rotational force with respect to the rotary swinging member 32 is applied to parts thereof in the vicinity of its two end parts. Therefore, the weight of the rotary swinging member 32 has no deleterious effect on the followup characteristic of the tracking servo system.

In the operational state wherein the rotary swinging member 32 is rotating at a speed of 30 revolutions per second, the fundamental frequency of the driving signal necessary for tracking control is 30 Hz. For this reason, in order to obtain good tracking control, it is necessary that the resonance frequency of the mechanical vibration system comprising the rotary swinging member 32 and the flexible plate 37 be higher than 30 Hz. It has been confirmed that, even with the use of a rotary swinging member 32 of a mass of the order of a number of tens of grams, the resonance frequency of the above-mentioned mechanical vibration system can be easily set at a value higher than 30 Hz.

In the above described embodiment of the invention, means such as slip-rings and brushes are not required for supplying a control current the control coil 42 since the control coil 42 is fixed to the fixed drum 22 and does not rotate.

The arrangement of parts need not be limited to that in the above described embodiment of the invention. For example, an arrangement wherein the control coil 42 is provided on the rotary swinging member 32, and the permanent magnets 35a and 35b are provided on the fixed drum 22, may be used. In this case, means such as slip-rings and brushes are necessary for supplying a control current to the control coil 42, which rotates, but since the control coil 42 is lighter than the permanent magnets, the rotary swinging member can be made to have a light construction and to have a good response over a wide range of frequencies.

The essential point in the device of the present invention is that the rotary swinging member is adapted to undergo the aforedescribed seesaw motion at the time of tracking control, and the controlling and driving means thereof need not be limited to a combination of permanent magnets and a control coil.

As the rotary swinging member 32 undergoes seesaw motion about the fulcrum point of the knife edges 40a and 40b of the fulcrum member 38, the heads 10a and 10b are displaced in directions perpendicular to the rotational path thereof, and, moreover, these displacements of the heads 10a and 10b are in mutually opposite directions and are of equal quantity. Since a seesaw motion is utilized in this manner in the present invention, the operation of tracking control of two rotary magnetic heads can be carried out simultaneously by one swinging operation of the rotary swinging member due to a single tracking control mechanism.

Next, an embodiment of the track control system applied to the apparatus of the invention will be described in conjunction with FIG. 8. In this system, an operational mode control circuit 51 sets the reproduction operational mode and produces a corresponding signal, which is fed to a tracking control signal generating circuit 52 and to a capstan servo circuit 53. A reference signal from a reference oscillator 54 is supplied to the capstan servo circuit 53 and to a drum servo circuit 55.

The capstan servo circuit 53 divides the frequency of the reference signal from the reference oscillator 54 with a frequency division ratio varied by the control signal from the operational mode control circuit 51 and obtains a signal of a frequency corresponding to the operational mode. Together with this operation, the capstan servo circuit 53 obtains a control signal from the signal thus obtained, a control signal reproduced from the control track of the magnetic tape 12 by a control head 56, and a pulse signal supplied from a pulse generator 59 which generates pulses in responsive accordance with the rotation of a capstan 57 for driving the tape 12 in cooperation with a pinch roller 58 and applies the control signal thus obtained to a capstan motor 60. The capstan motor 60 is controlled by this control signal to rotate at the rotational speed for the selected operational mode.

The drum servo circuit 55 obtains a control signal from a pulse signal generated by and sent from a tone wheel pulse generator 62 in responsive accordance with the rotation of a drum motor 61 and the rotary drum 21 and a reference signal from the reference oscillator 54 and applies this control signal to the drum motor 61 thereby to control the rotation thereof.

Figure 9:
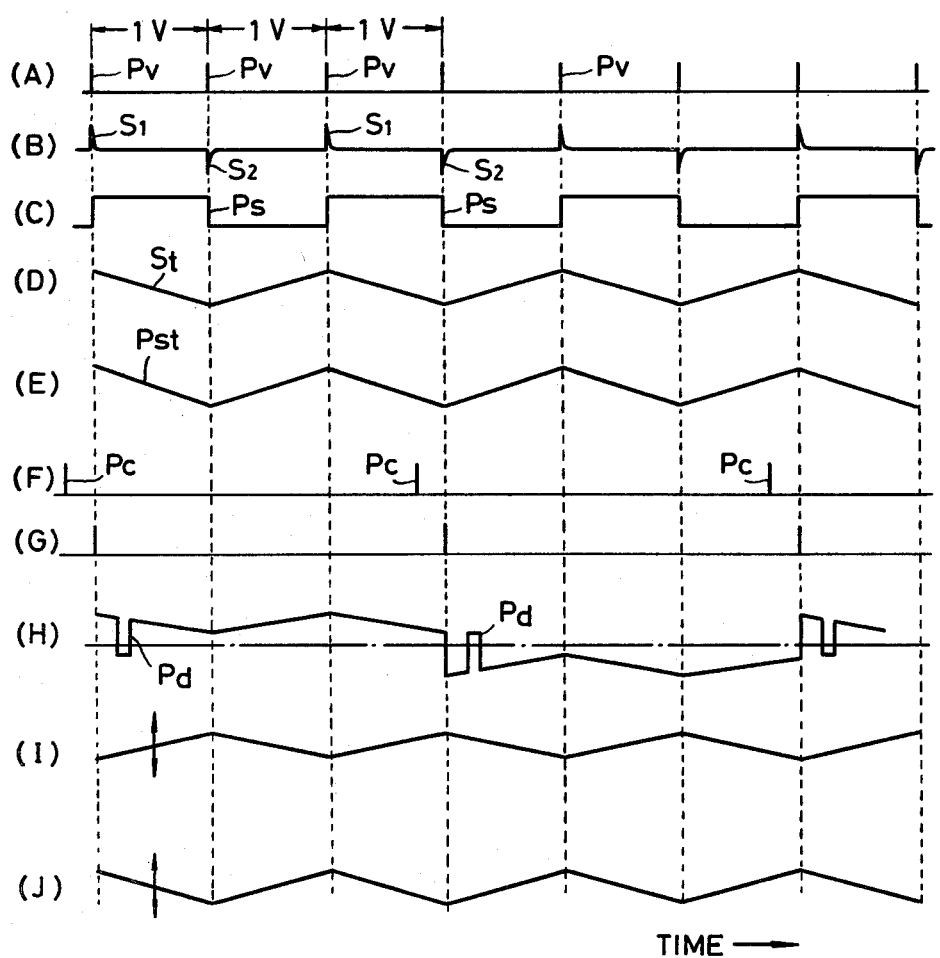
FIG. 9(A) through FIG. 9(J) are respectively graphs of waveforms of the signals at respective parts in the block diagram shown in FIG. 8.

The video signals reproduced by the rotary magnetic heads 30a and 30b from the magnetic tape 12 are supplied through a rotary transformer 25 and a preamplifier 63 to a switching circuit 64. Pulse signals $S_1$ and $S_2$ as indicated in FIG. 9(B) from tone wheel pulse generators 62 and 66 are supplied to and trigger a flip-flop 65. As a consequence, the flip-flop 65 generates rectangular pulses Ps as indicated in FIG. 9(C) having the same period as the rotating period of the rotary drum 21. These pulses Ps are fed to the switching circuit 64 to cause it to carry out switching operation and, at the same time, are fed to the tracking control signal generating circuit 52.

The switching circuit 64 supplies only the reproduced signal from the head carrying out normal tracking of the track of the magnetic tape, out of the signals from the preamplifier 63, to a video signal output circuit 67 and the tracking control signal generating circuit 52. The video signal output circuit 67 carries out a prescribed signal processing of the video signal thus supplied thereto and sends the processed signal through an output terminal 68 to a circuit of the succeeding stage. The video signal fed from the switching circuit 64 to the tracking control signal generating circuit 52 is subjected, for example, to envelope detection thereby to extract its amplitude fluctuation component, and its AC component is used in the forming of the tracking control signal. The tracking control signal generating circuit 52 may be so adapted that, in the case where a pilot signal for tracking control is contained in the reproduced signal, this pilot signal is used to generate the tracking control signal.

The tracking control signal generating circuit 52 integrates the rectangular pulses Ps from the flip-flop 65 and forms a signal St of triangular waveform as indicated in FIG. 9(D). The phase of this triangular wave signal is set in accordance with the response characteristic of the mechanical system including the rotary swinging member 32. This phase of the triangular wave signal may be appropriately set by employing, as the flip-flop 65, a circuit comprising a combination of the delay circuit depending on a monostable multivibrator and a rectangular wave pulse generating circuit depending on a flip-flop and suitably setting the phase of the rectangular wave pulses Ps thus generated. The tracking control signal generating circuit 52 uses this triangular wave St to form a tracking control signal Pst of a polarity and magnitude conforming to the operational mode and of a waveform as indicated in FIG. 9(E). This tracking control signal is supplied through a terminal 44 to the control coil 42.

The tracking control signal generating circuit 52 has a source for supplying DC bias power and possesses the functional capability of adjusting the DC bias power. Furthermore, this circuit 52 is so adapted that each required DC bias power in responsive accordance with information relating to the operational mode control circuit 51 is transmitted to the tracking control driving mechanism.

Control pulses Pc as indicated in FIG. 9(F) reproduced from the track 14 of the tape 12 by the control head 56 are supplied to the tracking control signal generating circuit 52 and trigger a monostable multivibrator which is provided within this circuit 52 and is capable of generating pulses of a pulse width of one vertical scanning period (1 V period). The output pulses of this monostable multivibrator is supplied to a gate circuit similarly provided within the circuit 52 and extract vertical synchronizing pulses Pv as indicated in FIG. 9(A). A tracking control signal is thus formed so that a specific magnetic head starts to trace the track at the time instant of the vertical synchronizing pulse Pv appearing immediately after a control pulse Pc.

When the operational mode is set for still-picture reproduction, control of the capstan motor 60 is so carried out that the magnetic tape 12 is caused to travel so that at least one control pulse Pc is reproduced, and, with the recorded position of the control pulse Pc thus reproduced as a reference datum, the magnetic tape is stopped at the position where a head starts to trace from the starting end of the track.

FIG. 9(H) indicates the waveform of the tracking control signal in the case of slow-motion reproduction wherein the slow-motion ratio is 3:1. In this case, the tracking control signal has a waveform which results from the superimposition of a triangular wave of the same period and the same polarity as the triangular wave of the control signal used at the time of still-picture reproduction as indicated in FIG. 9(E) on the rectangular wave having a repetitive period which is three times that of the above-mentioned rectangular wave pulses Ps indicated in FIG. 9(C) and, moreover, the further superimposition thereon of damping pulses Pd.

In general, the tracking control signal in the case of slow-motion reproduction wherein the slow-motion ratio is n:1 has a waveform resulting from the superimposition of a triangular wave of the same period and the same polarity as the triangular wave as indicated in FIG. 9(E) used at the time of still-picture reproduction and damping pulses Pd on the rectangular wave of a period which is twice that of the rectangular pulses Ps indicated in FIG. 9(C).

The amplitude (wave height value) of the triangular wave superimposed on the rectangular wave as mentioned above is made smaller than the amplitude of the triangular wave used at the time of still-picture reproduction as the slow-motion ratio increases. For the tracking control signal at the time of slow-motion reproduction wherein the slow-motion ratio is of a small value of a certain order, a signal resulting from the mere superimposition of the damping pulses Pd on a rectangular wave may be used. The single-dot chain line in FIG. 9(H) indicates the reference level in a state wherein a DC bias power described hereinafter is imparted.

The waveform of the tracking control signal at the time of quick-motion reproduction as indicated in FIG. 9(I) has a polarity opposite to that of the triangular wave used at the time of still-picture reproduction and, at the same time, is a triangular wave of the same period and an amplitude corresponding to the ratio of the quick-motion reproduction. In FIG. 9(I), the two arrow marks in the vertical directions indicate the variation of amplitude according to the quick-motion ratio.

The waveform of the tracking control signal at the time of quick-backward-motion is indicated in FIG. 9(J). The waveform of this tracking control signal is a triangular wave of the same polarity and the same period as the triangular wave used at the time still-picture reproduction.

While the embodiment of the control system shown in FIG. 8 has an open-loop arrangement, it may have a circuit construction of a closed loop. In this case, the tracking control signal is a signal resulting from the superimposition of the control signal indicated in FIG. 9 and a control signal formed by the closed loop. In this case, also, a DC bias power is superimposed on this tracking control signal.

In this case, if there is an error in the mounting heights of the heads 10a and 10b, a tracking deviation will occur. Therefore, a high precision is required in the adjustment of the mounting heights of the heads. For example, according to the production standards of our company, in the case of a track pitch of 58 $\mu$m., the allowable range of deviation of the head mounting height is specified to be within 3 $\mu$m. Then, in the device of the present invention, the heads 10a and 10b undergo seesaw motion and are mounted on a rotary swinging member 32. For this reason, it is difficult to determine precisely the height positions of the heads 10a and 10b by relying on only mechanical precision.

Accordingly, in the device of the invention, the above mentioned DC bias is additionally applied to the tracking control signal supplied to the control coil 42. The rotary swinging 32 and the heads 10a and 10b are inclined with an inclination direction and displacement quantity in responsive accordance with the polarity and magnitude of the DC power applied to the control coil 42, and the height positions of the heads 10a and 10b are adjusted.

In this adjustment and setting, for example, the standard tape recorded by the standard apparatus is reproduced, and, as the state of the picture produced by the signal thus reproduced and the waveform of the reproduced signal are observed, adjustment is carried out by increasing or decreasing the DC power applied to the control coil. The tracking control signal generating circuit is so set that the value of the DC power thus obtained after adjustment is imparted to the above mentioned tracking control signal as a reference level thereof, and a DC bias power is imparted to the control coil. The DC power may be in the form of DC current or of DC voltage.

As a result, the rotary swinging 32 undergoes the above described seesaw motion with the state of inclination in response to the DC bias power as a reference state (i.e., the state wherein the tracking control signal is zero) and in accordance with the polarity and magnitude of the tracking control signal. Therefore, tracking control of the heads 10a and 10b in a state wherein their height positions are adjusted is carried out.

Figure 10:
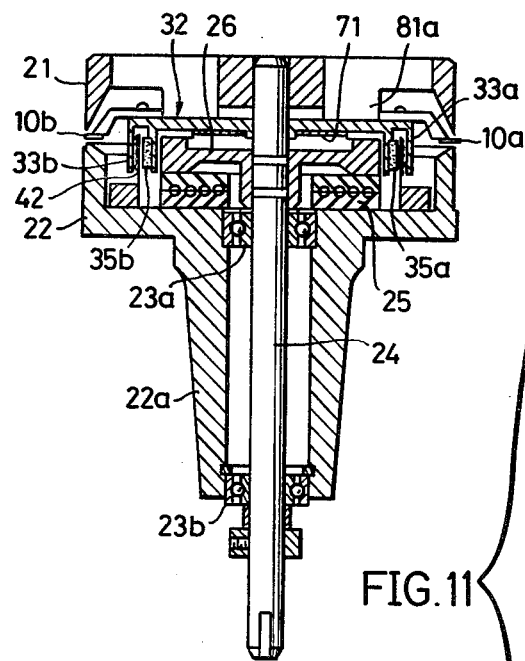
FIG. 10 is a vertical sectional view of a second embodiment of the magnetic recording and reproducing apparatus of the present invention.
Figure 11:
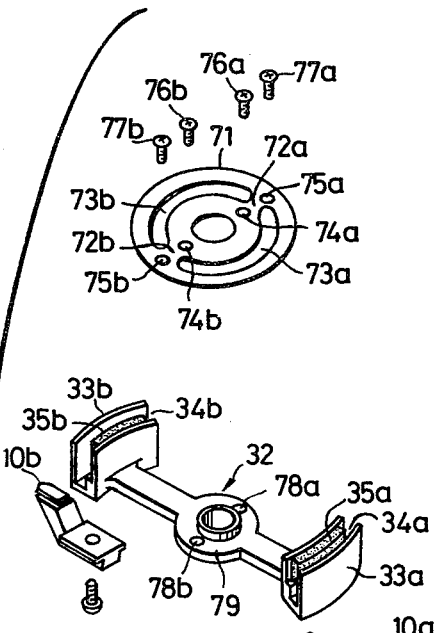
FIG. 11 is an exploded perspective view of an essential part of the apparatus of FIG. 10 as viewed from bottom side.
Figure 12:
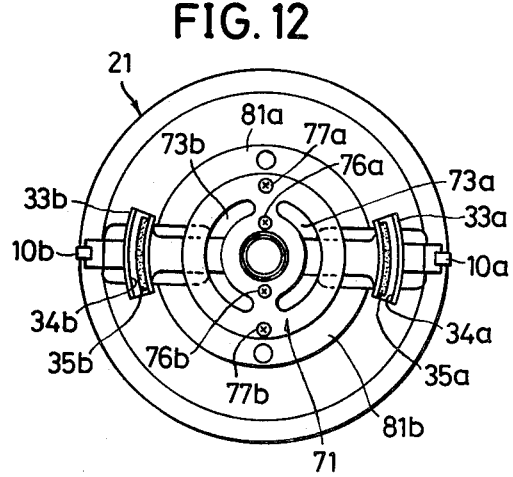
FIG. 12 is a bottom view of a rotary upper drum of the apparatus of FIG. 3.

Next, a second embodiment of the magnetic recording and reproducing apparatus according to the invention will be described in conjunction with FIGS. 10, 11, and 12. In FIGS. 10, 11, and 12, those parts which are the same as corresponding parts in FIGS. 3, 4, and 5 are designated by like reference numerals and will not be described again in detail.

In this device, there is provided an elastically flexible plate 71 made of a thin phosphor-bronze sheet and having the shape of a disc with opposed cutout slots 73a and 73b of semicircular arcuate shape separated by bridge parts 72a and 72b, which thereby connect outer and inner annular parts of the flexible plate 71 and serve as pivotal support parts. The flexible plate 71 is provided near the inner sides of the bridge parts 72a and 72b with holes 74a and 74b, through which screws 76a and 76b are inserted and screwed into tapped holes 78a and 78b formed in the central ring part 79 of a rotary swinging member 32. The flexible plate 71 is thus mounted on and secured to the ring part 79. In this case, the diametral line joining the bridge parts 72a and 72b is orientated in a direction perpendicular to the diametral line joining the centers of yoke parts 33a and 33b of the rotating rocking member 32.

The flexible plate 71 is further provided near the outer sides of the bridge parts 72a and 72b with holes 75a and 75b through which screws 77a and 77b are inserted and screwed into tapped holes 80a and 80b formed in boss parts 81a and 81b of a rotary drum 21. The flexible plate 71 is thus secured also to the boss parts 81a and 81b. With the above described parts in this state, the ring part 79 and the two arm parts extending radial outward therefrom of the rotary swinging member 32 are within the recessed part inside of the boss parts 81a and 81b and therefore do not contact the rotary drum 21.

As a result of a control signal being supplied to a control coil 42, the control coil 42 creates a magnetic field, and the mutual action between this magnetic field and permanent magnets 35a and 35b produces forces tending to displace these permanent magnets 35a and 35b in up and down directions. As a consequence, the rotary swinging member 32 secured to the flexible plate 71 by the screws 76a and 76b undergoes up and down rocking or swinging motion about the bridge parts 72a and 72b as a pivot as a result of the twisting of these bridge parts 72a and 72b of the flexible plate 71 secured to the boss parts 81a and 81b by the screws 77a and 77b. Furthermore, the rotary swinging member 32, being secured by way of the flexible plate 71 to the rotary drum 21, rotates unitarily therewith. The above described swinging motion can be carried out independently of this rotation.

In the present embodiment of the invention, the pivot member 38 of the preceding embodiment is not used, but it has been experimentally confirmed that, even without a pivot member, there is no possibility of the rotational pivotal position becoming obscure, and there is no deleterious effect whatsoever in actual practice.

In each of the above described embodiments of the invention, since the yoke parts 33a and 33b have a U-shaped cross section, the magnetic flux emanating from the permanent magnets 35a and 35b passes through the U-shaped yoke parts 33a and 33b and passes through a close magnetic path traversing the grooves 34a and 34b. For this reason, there is almost no magnetic flux leakage to the outside from the yoke parts 33a and 33b, and permanent magnets 35a and 35b have no deleterious effect on the rotary magnetic heads 10a and 10b.

In each of the above described embodiments of the invention, furthermore, the rotary magnetic heads 10a and 10b are mounted directly on the rotary swinging member 32, but a structural arrangement wherein the heads 10a and 10b are mounted on a bar-shaped head base, which is mounted in turn on the rotary swinging member, may be used.

The means for pivotally supporting the rotary swinging member in a freely swinging manner is not limited to flexible plate or to a combination of a flexible plate and a pivot member but may take a form wherein pivot bearings are provided on the sides of the central ring part of the rotary swinging member and are pivotally supported by a pivot shaft inserted through the side faces of the boss part of the rotary drum.

Furthermore, an arrangement wherein, instead of providing screws 45a and 45b as stops on the rotary drum 21, they are provided on the rotary swinging member 32, and, when the rotary swinging member 32 swings excessively, a screw abuts against the bottom surface of the rotary drum 21 may be used.

Further, this invention is not limited to these embodiments but various variations and modifications may be made without departing from the scope of the invention.

What I claim is:

1. A magnetic recording and reproducing apparatus comprising:
   a rotary swinging member rotating unitarily with a rotary shaft, said rotary swinging member having integrally therewith a pair of arcuate yoke parts at positions which are opposed in a diametric direction of a rotating plane of the rotary swinging member about a rotation center thereof, said yoke parts having U-shaped cross sections and accordingly having respective grooves therealong;
   permanent magnets respectively fixed to said pair of yoke parts in a state where their opposite polarities are opposed, said permanent magnets being respectively fixed to inner wall surfaces of said grooves;
   a pair of rotary magnetic heads supported on the rotary swinging member at positions opposed in a diametric direction of a rotating plane of the rotary swinging member about a rotation center thereof in a state where tips of said heads project outwards from outer surface of the yoke parts;
   fulcrum means for supporting said rotary swinging member in a freely swinging manner and acting as a fulcrum for swinging, said fulcrum being in a direction perpendicular, at a rotation center, to a line connecting said pair of rotary magnetic heads; and
   a control coil of cylindrical shape disposed at a position where said control coil exists in a magnetic field formed by the permanent magnet rotating with the rotary swinging member, said control coil being inserted relatively in said grooves, said control coil being supplied with a control signal;
   said rotary swinging member swinging in response to the control signal with said fulcrum means as a fulcrum for swinging.

2. A magnetic recording and reproducing apparatus as claimed in claim 1 which further comprises a guide drum comprising a fixed drum and a rotary drum having boss parts, and in which said fulcrum means comprises a resilient flexible plate secured at one part thereof to said rotary swinging member and at another part thereof to said boss part of said rotary drum, and said rotary swinging member, being connected by way of said flexible plate to said rotary drum and, at the same time, is free to swing through resilient deformation of said flexible plate.

3. A magnetic recording and reproducing apparatus as claimed in claim 2 which further comprises a pivot member which is secured to said boss part in a manner to clamp said flexible plate and has pivotal parts extending along a line perpendicularly intersecting, at the rotational center, a line joining magnetic heads provided on said rotary swinging member.

4. A magnetic recording and reproducing apparatus as claimed in claim 2 in which said flexible plate has concentric, mutually spaced apart, inner annular and outer annular parts respectively secured to a ring part of said rotary swinging member and said boss part of the rotary drum and mutually joined by a pair of bridge parts at diametrically opposite positions, whereby a pair of semicircular, arcuate cutout slots are formed, and said bridge parts function as pivots of the swinging motion of said rotary swinging member.

5. A magnetic recording and reproducing apparatus as claimed in claim 2 which further comprises a stopping member disposed in a position to confront said rotary swinging member and operating, when said rotary swinging member swings excessively, to contact said rotary swinging member thereby to prevent excessive swinging motion thereof.

6. A magnetic recording and reproducing apparatus as claimed in claim 2 which further comprises a stopping member disposed on said rotary swinging member on the side thereof confronting said rotary drum, said stopping member operating, when said rotary swinging member swings excessively, to contact said rotary swinging member thereby to prevent excessive swinging motion thereof.

7. A magnetic recording and reproducing apparatus as claimed in claim 1 in which, in the case where there is a height deviation in said rotary magnetic heads, a control signal on which a DC power responsive to this deviation is superimposed is applied to said control coil.

* * * * *